United States Patent Office 2,817,688
Patented Dec. 24, 1957

2,817,688

PREPARATION OF m- AND p-DIISOPROPYL-BENZENE

Herman I. Enos, Jr., Wilmington, Del., assignor to Hercules Powder Company, Wilmington, Del., a corporation of Delaware No Drawing. Application June 29, 1953
Serial No. 364,962

6 Claims. (Cl. 260—671)

This invention relates to the production of diisopropylbenzene and more particularly to the preparation of m-diisopropylbenzene and p-diisopropylbenzene.

The production of diisopropylbenzene for use as an antiknock fuel by alkylation of benzene with refinery gas is well known. However, the processes of the prior art have always led to mixtures of isomers from which the individual isomers were not separable in a pure state by distillation processes. The m-isomer, for instance, which is particularly desired for use as an intermediate for chemical syntheses by oxidation reactions, is not separable from the o-isomer by distillation nor from trimethylindane which is formed as a by-product from the o-isomer in the prior art processes. The presence of the o-isomer and trimethylindane was not recognized heretofore. In copending application, Serial No. 364,941, now abandoned, is described and claimed a process for the propylation of benzene to a mixture of diisopropylbenzene isomers free of the o-isomer and free of trimethylindane and from which m-diisopropylbenzene is readily separated by distillation. This process uses aluminum chloride as a catalyst in an amount within a critical range and a temperature in the range of 65–115° C. Under these conditions refinery gas cannot be used as the source of propylene, however, because other unsaturates present in the refinery gas also combine with the benzene ring. Thus, to attain the advantages of this process for producing a mixture containing no o-isomer or trimethylindane, this cheap source of propylene cannot be used directly.

Now in accordance with the present invention, it has been found that m-diisopropylbenzene can be produced by a process which involves propylation of benzene with refinery gas and also involves the use of the aluminum chloride catalyst at 65–115° C. whereby the readily separable mixture of m-diisopropylbenzene and p-diisopropylbenzene is produced. The process is carried out by propylating benzene with refinery gas using any suitable acid-acting condensation catalyst for the production of pure cumene and subsequently contacting the cumene with 0.1–2 mole percent of aluminum chloride at a temperature in the range of 65–115° C. and distilling m-diisopropylbenzene from the reaction mixture.

The process essentially involves an alkylation step for the preparation of cumene and a disproportionation step for transfer of isopropyl groups under conditions that produce a reaction mixture containing essentially m-diisopropylbenzene but no o-diisopropylbenzene or trimethylindane, from which mixture the m-diisopropylbenzene is separable by distillation. In the disproportionation step, other products such as benzene and polyisopropylbenzenes are produced. These by-products are preferably recycled to the disproportionation step so that there is a continuous constant amount of these by-products flowing back to this step in the process. Alternatively, the benzene may be separately recycled to the alkylation step.

The process of the present invention may thus be expressed in its more specific aspect by the following flow sheet:

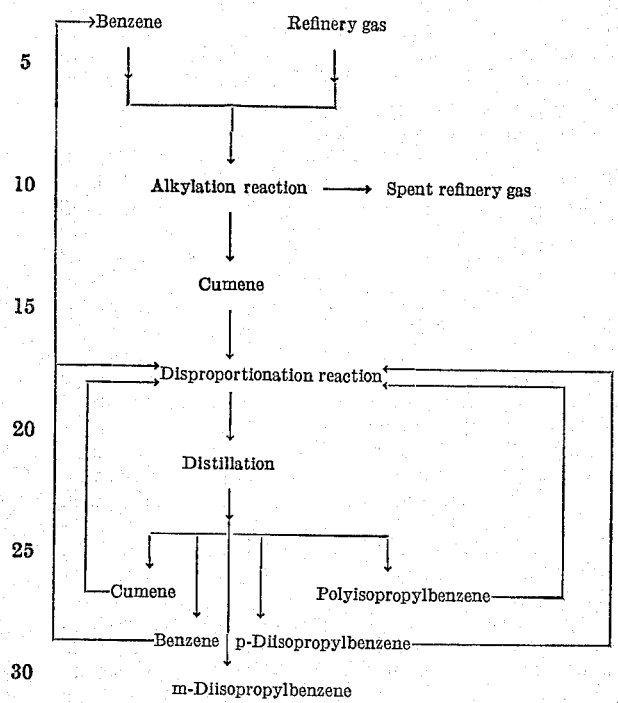

m-Diisopropylbenzene

The acid-acting condensation catalysts for effecting alkylation of benzene with propylene are well known in the art. In the production of cumene any of the catalysts such as sulfuric acid (80%), phosphoric acid on kieselguhr, ferric or cupric pyrophosphate, aluminum chloride, zinc chloride, acid clays, HF, $BF_3$ and its complexes with ether, or mixtures of any of these catalysts can be used since the cumene is readily prepared in pure form free of objectionable impurities.

The propylene-containing gas used in the alkylation step for the production of cumene should be free of higher molecular weight unsaturates which might also react, but the gas may contain ethylene from which the propylene will be removed due to its greater reactivity. The process of this invention is particularly well adapted for use of refinery gases which are mixtures of ethylene, propylene, and saturated hydrocarbon gases. The term "refinery gas" is used herein to include only such gases as are free of higher unsaturates such as butene or butadiene. Such a refinery gas can be readily obtained from a gas containing these higher molecular weight unsaturated gases by well known selective adsorption methods whereby the higher molecular weight unsaturates are removed. While the cumene prepared from gas containing these higher unsaturates can be readily purified by distillation, it is preferable to avoid a gas that unnecessarily gives more by-products.

The disproportionation step of the process of this invention involves a transfer of isopropyl radicals from one benzenoid radical to the other, thus resulting in a mixture approaching the composition of an equilibrium composition of benzene, cumene, diisopropylbenzene and small amounts of triisopropylbenzene. This composition, for the temperature range involved in this invention, is approximately as follows (wt. percents): benzene 17%, cumene 51%, m-diisopropylbenzene 20%, p-diisopropylbenzene 10%, triisopropylbenzene 2%.

The disproportionation step is carried out by mixing 0.1 to 2 mole percent anhydrous aluminum chloride powder with cumene preferably at a temperature below about 50° C. and then allowing the temperature to rise gradually to 65–115° C. at which temperature the reaction mixture is held until the resulting reaction mixture contains disproportionation products in amounts substantially such as corresponds to an equilibrium composition of approximately that set forth above. A particularly good method of operation for starting a batch is to add about 5 moles anhydrous aluminum chloride to 100 moles cumene cooled to about 10° C. and then to add the resulting mixture to 200–800 moles cumene which may be at any temperature up to about 115° C. The catalyst is added at such a rate to the cumene at this elevated temperature that the temperature is easily controlled. The cumene-aluminum chloride mixture should not be allowed to heat up above about 50° C. before being diluted with more cumene to the range of 0.1 to 2 mole percent based on the cumene with which it is mixed. The method of mixing the cumene and the aluminum chloride is not limited to any particular procedure, the only precaution to be observed is that the mole percent of aluminum chloride be kept in the range of 0.1 to 2 mole percent while the temperature is in the 65–115° C. range and preferably at any time the temperature is above about 50° C. for any appreciable period of time.

The reaction mixture, after it has reached equilibrium, is worked up by removing the catalyst by any of the well known methods such as by decantation or filtration with or without subsequent washing of the product, or by dilution with water, preferably containing acid or caustic to dissolve the aluminum hydroxide produced. The catalyst-free product after separation from the aqueous layer is then freed of water, by drying agent or by distilling. The products are then fractionally distilled to separate the benzene, cumene, m-diisopropylbenzene, p-diisopropylbenzene, and triisopropylbenzene in the proportions indicated above. The m-diisopropylbenzene is recovered and may be refractionated if the first fractionation is inadequate. The p-diisopropylbenzene may also be recovered. If the catalyst is separated by filtering it may be re-used in a subsequent reaction. In operating the process particularly for the production of m-diisopropylbenzene, the other alkylated products are recycled to the disproportionation reaction along with fresh cumene and fresh or recycled catalyst.

In such a recycling procedure in which the benzene is recycled to the disproportionation step, the benzene is advantageously used as the catalyst carrier. Thus the benzene is separately mixed with the aluminum chloride and the benzene slurry is added to the mixture of fresh cumene and other recycled by-products. The catalyst may also be formed as a cumene-aluminum chloride complex by heating at about 70–80° C. with the cumene while introducing dry HCl gas over a 15–20 minute period. This complex or a catalyst complex recovered from a previous alkylation may then be introduced alone or in a benzene slurry. In such a recycling process, the amount of fresh cumene added is equal in molecular quantity to approximately the amount of m-diisopropylbenzene withdrawn. All of the benzene is not recycled, but an amount molecularly equal to about the amount of m-diisopropylbenzene which is withdrawn in the process, is withheld and it is recycled to the alkylation step for conversion into cumene. In this manner a process is built up which involves withdrawing equimolecular amounts of benzene and m-diisopropylbenzene from the cycle and adding an amount of cumene equal to the sum of the molecular amounts of benzene and m-diisopropylbenzene withdrawn.

In a continuous recycled process starting from 83.4 lb. mol. cumene in the disproportionation step, about 12.3 lb. mol. m-diisopropylbenzene is produced and withdrawn. About 12.3 lb. mol. benzene is withdrawn and converted into cumene. About 6.0 lb. mol. p-diisopropylbenzene, about 0.9 lb. mol. triisopropylbenzene and about 42.5 lb. mol. cumene and about 9.5 lb. mol. benzene are recycled to the disproportionation reaction along with 24.6 lb. mol. fresh cumene. The cumene, which is recycled, is advantageously made into a catalyst complex with 0.1 to 2 lb. mol. anhydrous aluminum chloride per 24.6 lb. mol. cumene to aid in the introduction of the catalyst to the system. If desired or necessary to thin the catalyst complex, it may be diluted with part or all of the benzene to be used in the disproportionation reaction, care being taken to keep the temperature from rising above about 50° C.

The disproportionation conditions for the process of this invention are critical. The catalyst is anhydrous aluminum chloride or a complex thereof with the hydrocarbons in the system. The amount of catalyst is the amount required for disproportionation, but not more than 2 mole percent since larger amounts effect ring closure between adjacent isopropyl radicals in o-diisopropylbenzene which may be formed in trace amounts during the process and are converted into trimethylindane when the temperature is that required for the disproportionation. Thus, the aluminum chloride must be used in the range of 0.1–2 mole percent based on the benzenoid starting material or the moles of disproportionation products and preferably in the range of 0.3 to 0.8 mole percent.

The disproportionation temperature likewise is critical in that a temperature of at least 65° C. is required to produce the desired high yield of m-diisopropylbenzene and a temperature above 115° C. will favor formation of trimethylindane. For these reasons, the temperature for the disproportionation reaction is kept within the range of 65–115° C., preferably in the range of 80–115° C. The reaction time is that required for disproportionation to reach a stage in which a substantial amount of m-diisopropylbenzene is formed and preferably that at which equilibrium is substantially attained. The time required is usually 1 minute to 1 hour and prolonged heating is undesirable.

In carrying out the process of this invention, the lower concentration of aluminum chloride catalyst in the range set forth is used with the higher temperatures in the range set forth, and the higher concentration of aluminum chloride catalyst in the range set forth is used with the lower temperatures in the range set forth. Thus, 0.1 mole percent aluminum chloride used at a reaction temperature of 115° C. and 2 mole percent of aluminum chloride used at a reaction temperature of 65° C. will produce in either case a mixture of m- and p-diisopropylbenzene substantially free of o-diisopropylbenzene and trimethylindane from which m- and p-diisopropylbenzene are separable in substantially pure form.

The process of this invention is particularly advantageous to use when propylene, other than that in refinery gas, is unavailable except at high cost. It makes possible the use of low cost refinery gas without introducting the contaminants that would be introduced in producing diisopropylbenzene directly and provides a mixture of m- and p-isomers not readily available by prior art alkylation processes.

Unless otherwise stated herein all percentages are by weight.

What I claim and desire to protect by Letters Patent is:

1. The method of preparing a diisopropylbenzene substantially free of o-diisopropylbenzene and trimethylindane which comprises propylating benzene in an alkylation reaction with a substantially equimolecular amount of a propylene-containing gas, containing no higher molecular weight unsaturates, at as low a temperature in the range of 30°–150° C. and in the presence of as small an amount of an alkylation catalyst as will bring about alkylation, until cumene is produced as a major product, separating the cumene free of trimethylindane and other by-products of the reaction, contacting a disproportionation reaction mixture consisting essentially of said cumene with 0.1 to 2 mole percent, based on the disproportionation reaction mixture, of aluminum chloride at a temperature in the range of 65°–115° C. to effect a disproportionation reaction until the disproportionation reaction mixture contains a substantial amount of m-diisopropylbenzene and is substantially free of o-diisopropylbenzene and trimethylindane, and separating at least one of the group of m-diisopropylbenzene and p-diisopropylbenzene from the disproportionation reaction mixture by distillation, recovering benzene and cumene from the disproportionation reaction, and recycling the benzene to the alkylation reaction and the cumene to the disproportionation reaction.

2. The method of preparing a diisopropylbenzene substantially free of o-diisopropylbenzene and trimethylindane which comprises propylating benzene in an alkylation reaction with a substantially equimolecular amount of a propylene-containing gas, containing no higher molecular weight unsaturates, at as low a temperature in the range of 30°–150° C. and in the presence of as small an amount of an alkylation catalyst as will bring about alkylation, until cumene is produced as a major product, separating the cumene free of trimethylindane and other by-products of the reaction, contacting a disproportionation reaction mixture consisting essentially of said cumene with 0.3 to 0.8 mole percent, based on the disproportionation reaction mixture, of aluminum chloride at a temperature in the range of 80°–115° C. to effect a disproportionation reaction until the disproportionation reaction mixture contains a substantial amount of m-diisopropylbenzene and is substantially free of o-diisopropylbenzene and trimethylindane, and separating at least one of the group of m-diisopropylbenzene and p-diisopropylbenzene from the disproportionation reaction mixture by distillation, recovering benzene and cumene from the disproportionation reaction, and recycling the benzene to the alkylation reaction and the cumene to the disproportionation reaction.

3. The method of preparing a diisopropylbenzene substantially free of o-diisopropylbenzene and trimethylindane which comprises propylating benzene in an alkylation reaction with a substantially equimolecular amount of a propylene-containing gas, containing no higher molecular weight unsaturates, at as low a temperature in the range of 30°–150° C. and in the presence of as small an amount of an alkylation catalyst as will bring about alkylation, until cumene is produced as a major product, separating the cumene free of trimethylindane and other by-products of the reaction, contacting a disproportionation reaction mixture consisting essentially of said cumene with 0.1 to 2 mole percent, based on the disproportionation reaction mixture, of aluminum chloride at a temperature in the range of 65°–115° C. to effect a disproportionation reaction until the disproportionation reaction mixture contains a substantial amount of m-diisopropylbeznene and is substantially free of o-diisopropylbenzene and trimethylindane, and separating m-diisopropylbenzene from the reaction mixture by distillation, recovering benzene and cumene from the disproportionation reaction, and recycling the benzene to the alkylation reaction and the cumene to the disproportionation reaction.

4. The method of preparing a diisopropylbenzene substantially free of o-diisopropylbenzene and trimethylindane which comprises propylating benzene in an alkylation reaction with a substantially equimolecular amount of a propylene-containing gas, containing no higher molecular weight unsaturates, at as low a temperature in the range of 30°–150° C. and in the presence of as small an amount of an alkylation catalyst as will bring about alkylation, until cumene is produced as a major product, separating the cumene free of trimethylindane and other by-products of the reaction, contacting a disproportionation reaction mixture consisting essentially of said cumene with 0.1 to 2 mole percent, based on the disproportionation reaction mixture, of aluminum chloride at a temperature in the range of 65°–115° C. to effect a disproportionation reaction until the disproportionation reaction mixture contains a substantial amount of m-diisopropylbenzene and is substantially free of o-diisopropylbenzene and trimethylindane, and separating at least one of the group of m-diisopropylbenzene and p-diisopropylbenzene from the disproportionation reaction mixture by distillation, and recycling the other disproportionation products to the disproportionation reaction, recovering benzene and cumene from the disproportionation reaction, and recycling the benzene to the alkylation reaction and the cumene to the disproportionation reaction.

5. The method of preparing a diisopropylbenzene substantially free of o-diisopropylbenzene and trimethylindane which comprises propylating benzene in an alkylation reaction with a substantially equimolecular amount of a propylene-containing gas, containing no higher molecular weight unsaturates, at as low a temperature in the range of 30°–150° C. and in the presence of as small an amount of an alkylation catalyst as will bring about alkylation, until cumene is produced as a major product, separating the cumene free of trimethylindane and other by-products of the reaction, contacting a disproportionation reaction mixture consisting essentially of said cumene with 0.1 to 2 mole percent, based on the disproportionation reaction mixture, of aluminum chloride at a temperature in the range of 65°–115° C. to effect a disproportionation reaction until the disproportionation reaction mixture contains a substantial amount of m-diisopropylbenzene and is substantially free of o-diisopropylbenzene and trimethylindane, separating m-diisopropylbenzene from the reaction mixture by distillation and recycling the other disproportionation products to the disproportionation reaction, recovering benzene and cumene from the disproportionation reaction, and recycling the benzene to the alkylation reaction and the cumene to the disproportionation reaction.

6. The method of preparing a diisopropylbenzene substantially free of o-diisopropylbenzene and trimethylindane which comprises propylating benzene in an alkylation reaction with a substantially equimolecular amount of a propylene-containing gas, containing no higher molecular weight unsaturates, at as low a temperature in the range of 30°–150° C. and in the presence of as small an amount of an alkylation catalyst as will bring about alkylation, until cumene is produced as a major product, separating the cumene free of trimethylindane and other by-products of the reaction, contacting a disproportionation reaction mixture consisting essentially of said cumene with 0.1 to 2 mole percent, based on the disproportionation reaction mixture, of aluminum chloride at a temperature in the range of 65°–115° C. to effect a disproportionation reaction until the disproportionation reaction mixture contains a substantial amount of m-diisopropylbenzene and is substantially free of o-diisopropylbenzene and trimethylindane, separating p-diisopropylbenzene from the reaction mixture by distillation and recycling the other disproportionation products to the disproportionation reaction, recovering benzene and cumene from the disproportionation reaction, and recycling the benzene to the alkylation reaction and the cumene to the disproportionation reaction.

References Cited in the file of this patent

UNITED STATES PATENTS

| | | |
|---|---|---|
| 2,010,948 | Egloff | Aug. 13, 1935 |
| 2,421,331 | Johnson | May 27, 1947 |
| 2,450,652 | Francis | Oct. 5, 1948 |
| 2,465,610 | Short et al. | Mar. 29, 1949 |
| 2,744,150 | Enos | May 1, 1956 |

OTHER REFERENCES

Shreve: Industrial and Eng. Chem., vol. 40, p. 1569 (1948).

Nightingale: Chemical Reviews, vol. 25, p. 351 (1939).